(12) United States Patent
Light et al.

(10) Patent No.: US 6,483,900 B1
(45) Date of Patent: Nov. 19, 2002

(54) METHOD AND APPARATUS FOR OBTAINING TELEPHONE STATUS OVER A NETWORK

(76) Inventors: Elliott D. Light, 12 Bentana Way, Rockville, MD (US) 20850; Jon L. Roberts, 529 Clear Spring Rd., Great Falls, VA (US) 22066

( * ) Notice: Subject to any disclaimer, the term of this patent is extended or adjusted under 35 U.S.C. 154(b) by 0 days.

(21) Appl. No.: 09/265,656

(22) Filed: Mar. 2, 1999

Related U.S. Application Data (63) Continuation-in-part of application No. 08/963,373, filed on Oct. 20, 1997, now Pat. No. 6,175,616.

(51) Int. Cl.⁷ .............................................. H04M 3/42
(52) U.S. Cl. .............................. 379/88.17; 379/106.01; 379/207.4
(58) Field of Search .................. 379/32.01, 38, 379/39, 42, 43, 88.12, 88.14, 88.17, 88.18, 90.01, 93.01, 93.17, 201.01, 207.04, 207.06, 207.07, 100.05, 100.06, 102.05, 102.06, 102.01, 106.01, 106.02, 106.08, 900; 709/217, 218, 224

(56) References Cited

U.S. PATENT DOCUMENTS

| | | | |
|---|---|---|---|
| 3,989,899 A | 11/1976 | Norwich | 179/2 DP |
| 4,166,929 A | 9/1979 | Sheinbein | 179/18 BG |
| 4,559,416 A | 12/1985 | Theis et al. | 179/7.1 R |
| 4,734,931 A | 3/1988 | Bourg et al. | 379/93 |
| 4,759,055 A | 7/1988 | Okumura et al. | 379/157 |
| 5,023,868 A | 6/1991 | Davidson et al. | 370/62 |
| 5,425,091 A | 6/1995 | Josephs | 379/201 |
| 5,500,893 A | 3/1996 | Onosaka | 379/396 |
| 5,530,740 A | 6/1996 | Irribarren et al. | 379/89 |
| 5,647,002 A | 7/1997 | Brunson | 380/49 |
| 5,943,399 A | 8/1999 | Bannister et al. | 379/88.17 |
| 6,125,176 A * | 9/2000 | Foladare et al. | 379/211 |
| 6,175,616 B1 | 1/2001 | Light et al. | 379/88.14 |
| 6,208,725 B1 * | 3/2001 | Davies | 379/201 |

\* cited by examiner

Primary Examiner—Scott L. Weaver
(74) Attorney, Agent, or Firm—Roberts Abokhair & Mardula, LLC (57) ABSTRACT

A system and method for determining telephone status over a network. The system and method provides for off hook status to be determined by a switch or other monitor that then provides that information to a telephone status file. The telephone status file is accessible over the Internet by computer so that a calling party can first determine if the called party is on the telephone. Thus wasted time in making calls that cannot be completed is avoided. The system operates over normal PSTN's, over cable systems, and over the Internet.

16 Claims, 6 Drawing Sheets

METHOD AND APPARATUS FOR OBTAINING TELEPHONE STATUS OVER A NETWORK

RELATIONSHIP TO OTHER INVENTIONS

This application is a continuation in part of application Ser. No. 08/963,373, filed Oct. 20, 1997, now U.S. Pat. No. 6,175,616.

BACKGROUND OF THE INVENTION

This invention relates generally to electronically determining the status of a telephone over a network. More specifically, the present invention provides a method and apparatus for obtaining the status of a telephone (whether on-hook or off-hook) over a network in order to maximize the probability of reaching a desired party. It also provides a method and apparatus for sending an e-mail to the desired party for storage as a voice mail message.

BACKGROUND ART

Literally millions of times per day, parties attempt to contact one another, only to find that the party initiating the telephone call receives a busy signal or is put into the phone mail of the receiving telephone when that telephone is off-hook. Not only is this experience frustrating for the caller, but can result in lost business or social opportunities on the part of the receiving party who is on the line speaking with someone else. In addition, receiving busy signals and the inability to complete telephone calls results in the loss of millions of dollars in revenue both from the time expended by the caller in trying to reach the desired party, as well as lost opportunities for commerce or other social contact.

Telephone line activity monitoring has been the subject of invention in the past. For example, U.S. Pat. No. 4,559,416 to Theis, et. al. describes a form of line activity monitoring for the purpose of obtaining information regarding statistics of line usage. This system detects the usage of the line, but not transmit status information to others in any current fashion.

U.S. Pat. No. 3,989,899 to Norwich describes yet another monitoring system whose purpose is to notify an operator that a telephone line is open so that a desired message can be delivered by the operator to a receiving party. This system comprises an automatic dialer which attempts to reach individuals on a repetitive basis until a connection is made. Again, status of the telephone at any given point of time is not provided.

U.S. Pat. No. 4,734,931 to Bourg, et. al. describes an integrated calling directory comprising a personal computer that stores information about the numbers being called. It does not address the problem associated with the called party telephone being in an off-hook condition. This is not reported in any fashion to the initiator of the telephone call.

U.S. Pat. No. 5,530,740 to Irribarren, et. al. described a communication system comprising a voice message system for storing and retrieving voice messages and faxed data and for converting text into voice messages. This system does not deal with the issue of how to contact the party receiving the phone call but only leaves a message for that party in the event that the phone is in an off-hook condition.

U.S. Pat. No. 5,500,893 to Onosaka is yet another information processing system having a telephone and an informational processing device. Again this invention does not address the issue of whether a called party telephone is in an on-hook or off-hook condition.

U.S. Pat. No. 5,647,002 to Brunson describes a system for synchronization of mail boxes over a network. This system is designed to ensure that information in electronic mail is complete in a series of different mail boxes. The issue of providing information to a caller regarding the status of a called party's telephone is not dealt with.

What is desired is a system whereby a calling party can pre-determine the status of a called party's telephone (on-hook or off-hook) so as to maximize the opportunity for completing a telephone call to the desired party.

DESCRIPTION OF THE INVENTION

It is therefore an object of the present invention to maximize the probability that a calling party will actually contact a called party when a telephone call is made.

It is a further objective of the present invention to provide a status of the called party's telephone (on-hook or off-hook) before the calling party makes the telephone call to the called party.

It is a further objective of the present invention to provide telephone status information over a network.

It is a further objection of the present invention to continually monitor the status of a telephone in order to provide the telephone in order to provide the telephone status information desired.

It is a further objective of the present invention to store telephone line status in a file that can be accessed by others.

It is a further objective of the present invention to constantly update the telephone line status file so that callers accessing the file can have an up-to-date record of the status of a telephone to be called.

It is a further objective of the present invention to obtain the status of a called party's telephone over cable systems connected to public switched telephone networks.

It is yet another objection to obtain the status of a called party's telephone when both the called party and the calling party are connected to cable systems.

It is a further objective of the present invention to obtain the status of a called party's telephone when the called party is connected to a cable system but the calling party is not.

It is yet another objective of the present invention to generally provide information concerning home and office equipment and functions to a file that can be accessed by networks external to the home, such as the Internet.

These and other objectives of the present invention will become apparent from a review of the general and detailed descriptions that follow. The present invention provides a method for a calling party to receive constantly updated information concerning the status of a telephone (on-hook or off-hook) to be called. For purposes of this specification this status will generally be called the "telephone status." The present invention also provides a way for a calling party to leave e-mail and voice mail to the called party as part of the determination of telephone status.

The present invention comprises a monitoring system which can constantly poll a series of telephones, and stores information concerning the telephone status in a telephone status file. Alternatively, the system switch simply records the off-hook status of a telephone of the system and provides a notation to a file that is accessible to others. Thus, a telephone is presumed to be on-hook unless it is determined to be off-hook. That file is one that, in a preferred embodiment, can be accessed over the Internet. When a calling party desires to maximize its probability of actually being connected with a called party, the calling party accesses the telephone's status file over the Internet and receives a determination of whether the called telephone is on-hook or off-hook. When an off-hook condition is noted, the calling party will not attempt to place the telephone call. In addition, the calling party may elect to alert the called party that a call was attempted, to send an e-mail and have the e-mail delivered as a voice mail message, or to be signaled when the called party's phone is on-hook. When the telephone status is noted as on-hook, the calling party can then make the telephone call with some reasonable assurance of reaching the telephone of the called party.

This system differs from existing private branch exchanges (PBX) in that a current PBX can have a "camp on" feature that allows a use to place a phone call to a telephone on the PBX, note that the called telephone is off-hook and "camp on" to the called party's telephone line so that when an on-hook condition is noted, the PBX can automatically connect the calling party to the called party. The difficulty with such camp on systems is that they cannot be used by people outside the PBX. In addition, when using the camp on feature, the call is "camped" only after is placed. The caller still has invested both time and money in exchange for a busy signal. In contrast to existing PBX camp on systems, the system and method of the present invention allows a user to be advised of the status of a telephone via network external to the location of the telephone to maximize the probability of actually making the desired connection.

An alternative embodiment of the present invention is to connect the calling party's telephone to the computer at the calling party's location. Thereafter, upon a determination by the calling party's telephone is such that a call can be made, the user's computer will then dial the user's telephone prompting the user to pick that telephone up and thereafter dial the called party's telephone thereby completing the telephone call in an automated fashion.

A further embodiment of the present invention is to use the computer connect to send the called party an e-mail and then have the e-mail delivered to the called party's voice mail box.

It is also the case the telephone companies are seeking to expand their markets for both long distance and local services. This expansion has caused certain long distance to acquire cable companies in order to provide local service to customers. This cable-borne telephone is yet another way for long distance carriers to reach local users by virtue of the cable system infrastructure already in place. Where such cable infrastructure exists, it is also possible to obtain the telephone status of users telephones over the cable system.

Obtaining telephone status over the cable network occurs in a similar fashion to that already noted above. In a first embodiment, a called party's telephone is either plugged into a set-top box or other interface through which telephone services are offered. Alternatively, the called party's telephone is connected to a computer system which is in turn connected to a set-top box ore other telephone and/or data interface for those cable operations that offer Internet-over-cable service. The off-hook status of the telephone at the called party's location is determined via a switch at the telephone company (telco). That off-hook status is provided to a file that is accessible over the Internet.

Thus, a calling party, desiring to obtain the status of the telephone at a location having cable service would again access the Internet and obtain information from the telephone status file which is constantly updated by the telco switch. Conversely, information concerning telephone status file over the cable network. In this manner, any user can obtain the telephone status via a computer system linked to the Internet via a cable operator. In addition, telephone status can be provided to a telephone status file over the Internet for those telephones that can use local cable operator infrastructure to connect to the public switched telephone network.

As noted above, a calling party at the cable location can also obtain the telephone status of the called party telephone by simply using the computer that is plugged into the set-top box or other telephony/data interface provided to go over the Internet to the telephone status file. This additional cable network thereby allows updating of the telephone status file and allows telephone status to be obtained in yet another fashion.

The present invention is more fully described by reference to the figures that follow.

DETAILED DESCRIPTION OF THE INVENTION

The present invention is a system and method for obtaining the telephone status (on-hook/off-hook) of a called party's telephone over a network external to the location of the called party's telephone, such as the Internet.

Figure 1:
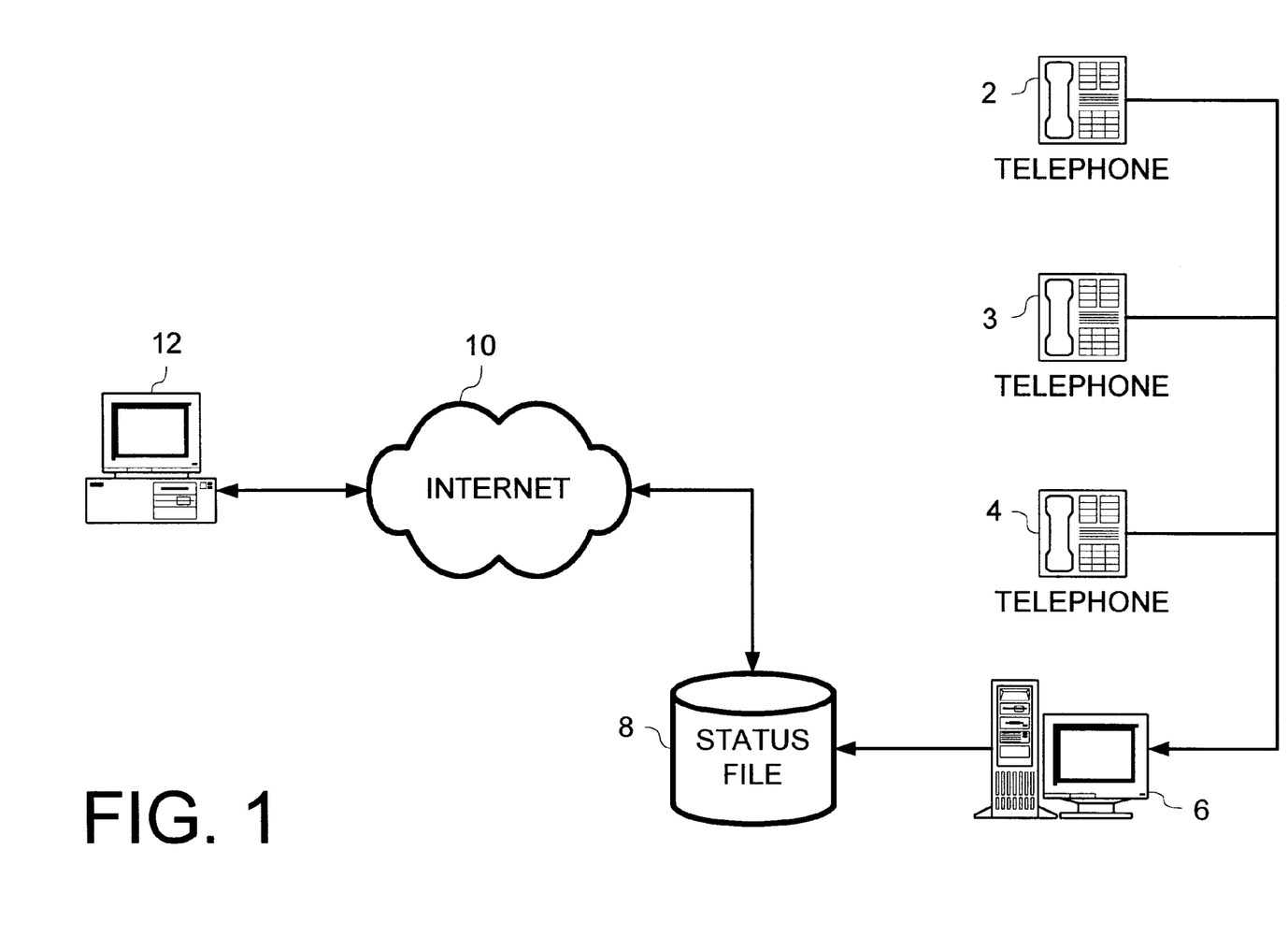
FIG. 1 shows the basic architecture of the telephone status monitor.

Referring to FIG. 1, the general architecture of the telephone status monitor is described. Using a personal computer or other similar type of processor 12 a user accesses a network, in this case the Internet 10, although this is not meant as a limitation. Any network that can be connected to a calling party and a called party can also be used. The calling party accesses the telephone status file 8 which is continually updated by a telephone status monitor 6 which constantly monitors a series of telephones 2, 4. It should be noted that it is anticipated that many thousands of telephones will be monitored in this fashion. Eventually it is anticipated that millions of phones will be so monitored. The monitoring function can be accomplished by special equipment for that purpose or is simply the output of a switch that recognizes when a particular telephone is off-hook on the network.

The status file 8 is continually updated by monitor 6 with the on-hook or off-hook status of telephones that are monitored. Thus, the calling party communicating with a PC 12 can receive "real time" status (as determined by the sampling rate of the monitor) of a telephone being called by simply monitoring the telephone status file that is accessible over the Internet.

Since the status file is anticipated to contain many thousands of numbers it is anticipated as past of the present invention that when a calling party using its PC 12 requests the status of a particular telephone that only the status of that telephone will subsequently be displayed on the user PC.

Alternatively, the user PC 12 may create a list of numbers to monitor and have the data "pushed" over the Internet 10 to the calling party's PC 12.

Figure 2:
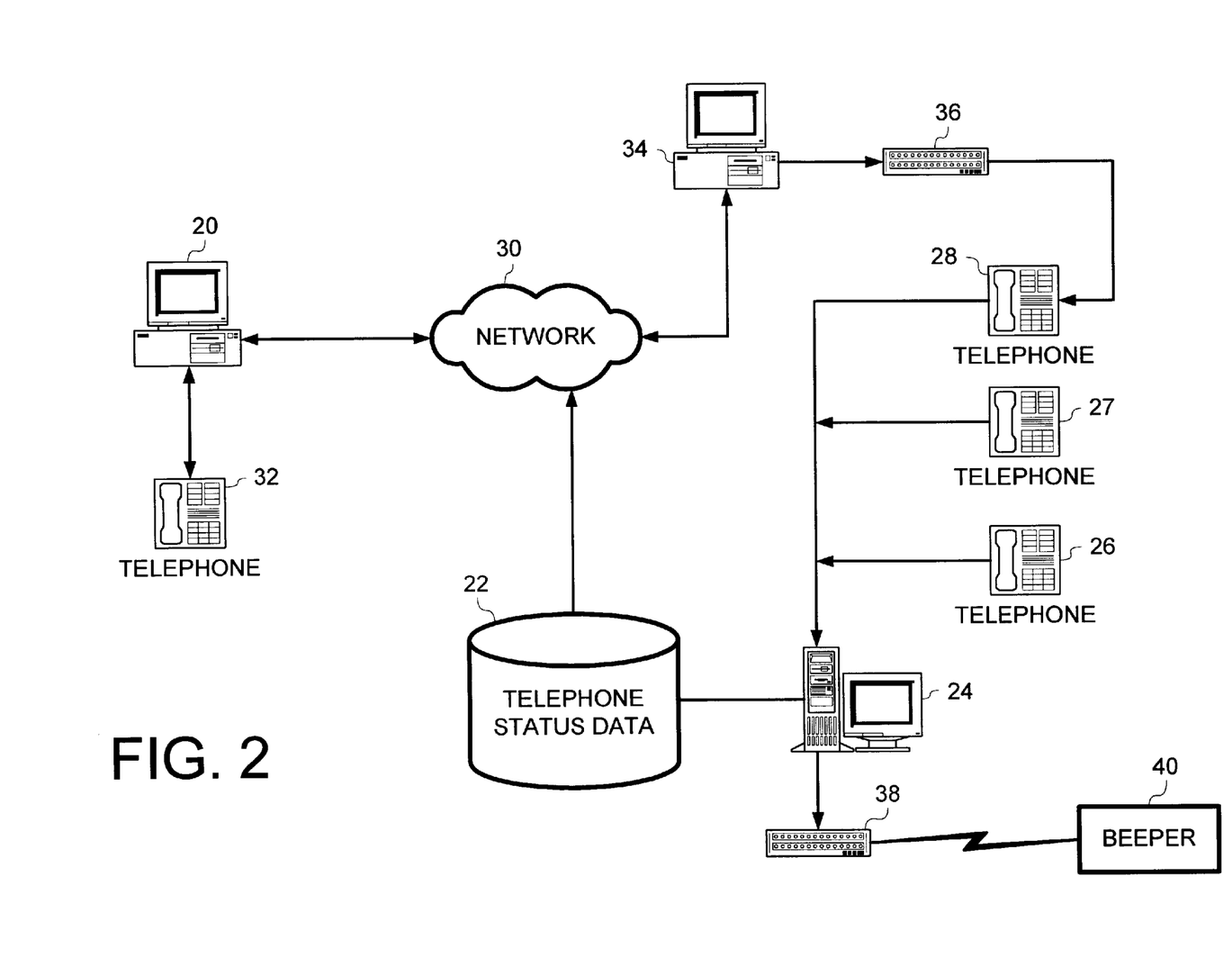
FIG. 2 shows an alternate embodiment of the telephone status monitor.

Referring to FIG. 2, an alternate embodiment of the present invention is shown. In this case, calling party's PC 20 accesses the telephone status file 22 over the Internet 30. Again, the telephone status file 22 is continually updated by a telephone status monitor 24 which monitors telephones 26 and 28 (again these are representative of a plurality of telephones fully monitored by the system). In this case, however, the calling party has a telephone 32 that is connected to the calling party's PC 20. When the calling party's PC 20 monitors the status of a called party via the status file 22 as soon as the called party status indicates an on-hook condition on the user PC 20 will then place a telephone call to the called party thereby making the entire connection process an automated one. This embodiment finds particular utility in a private branch exchange (PBX) where a telco switch is ordinarily not monitoring individual telephones.

Referring again to FIG. 2, the calling party may also send an e-mail to the called party's PC 34. The e-mail is converted from text to digital voice at converter 36 and routed to the voice mail box 36 and routed to the voice mail box 36 of the called party.

Figure 3:
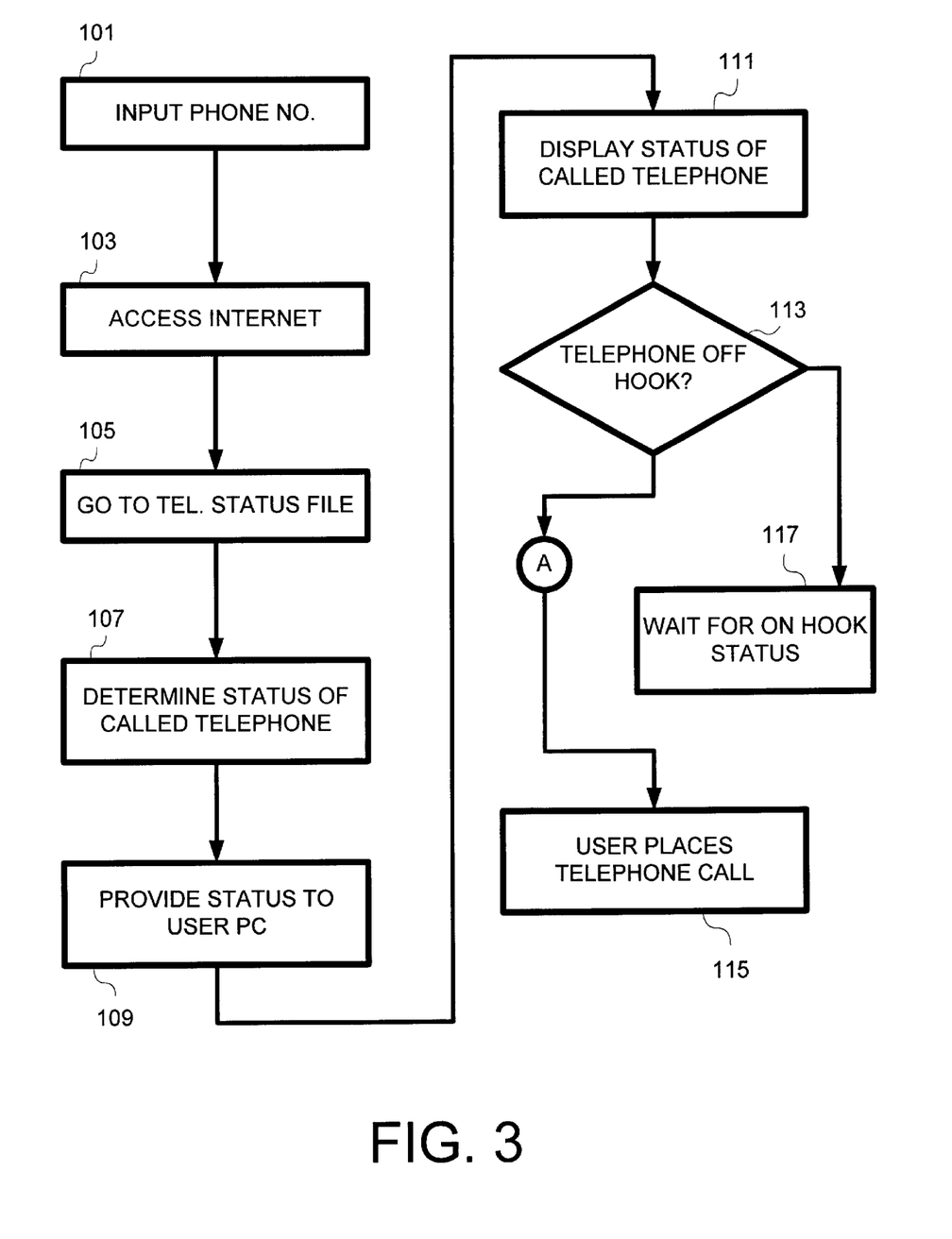
FIG. 3 shows the process of the telephone status monitor.

Referring to FIG. 3, the flow of the method of the present invention is shown. A calling party having a PC inputs a telephone number to be called (the called party) 101. Thereafter, the calling party's PC connects to the Internet 103 subsequently accesses the telephone status file 105. The status of the called party's telephone number is then determined 107 and that status is provided back to the calling party's PC 109 noting that status of the called party's telephone line.

Upon receipt of the called party's status, that information is displayed for the calling party 111 and thereafter, if the called party's telephone lie status is in an on-hook condition, the user can then dial the called party 113.

Figure 4:
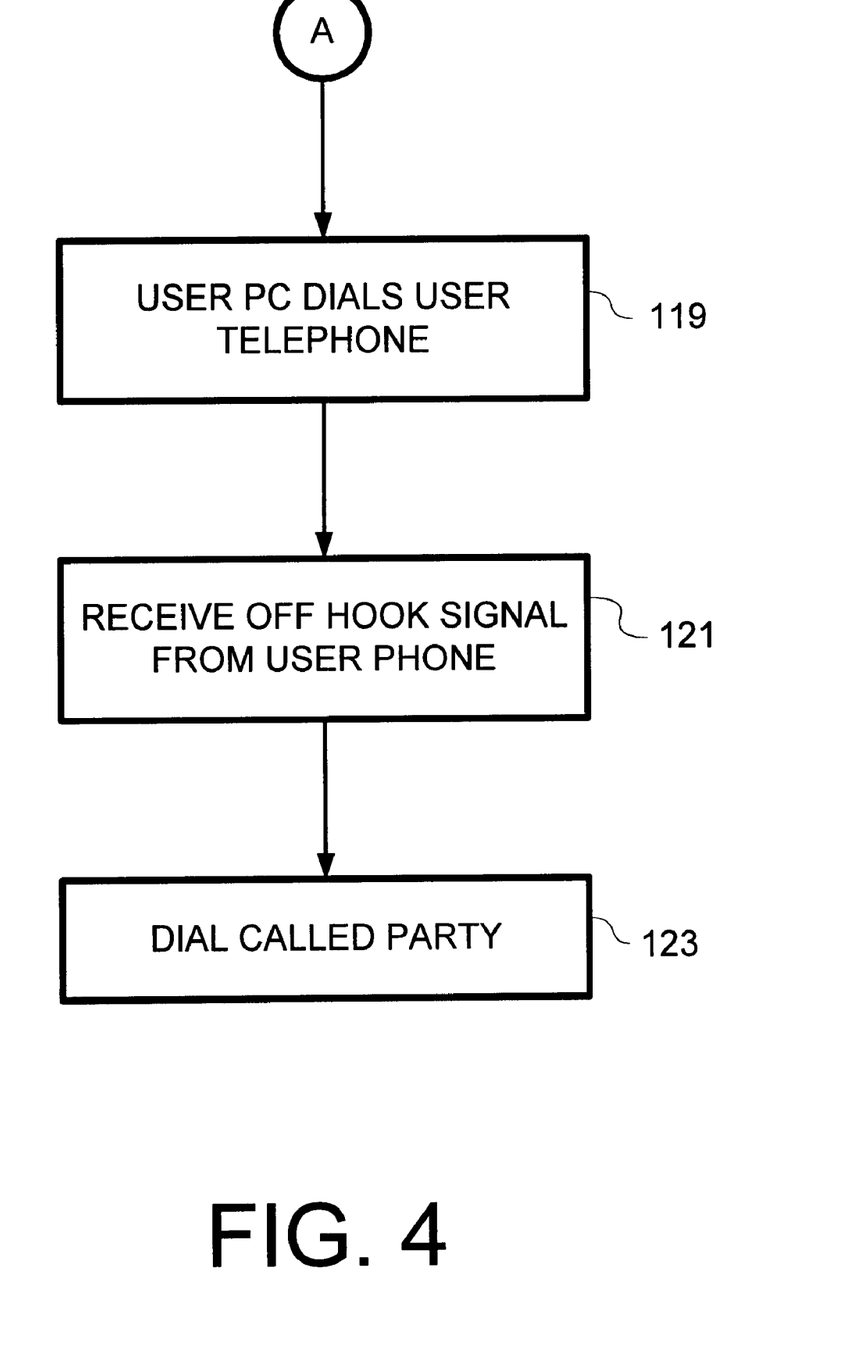
FIG. 4 shows an alternate embodiment of the process of the telephone status monitor.

Referring to FIG. 4, an alternate embodiment of the present invention is shown. All of the steps of the access to the status of the called party's telephone line is the same is noted previously in FIG. 3. However, instead of the user making the telephone call, the PC continually monitors the telephone status file. Upon noting that the called party's telephone status is in an on-hook condition, the calling party's PC dials the called party's telephone 115. The calling party's PC then waits to receive an on-hook signal from the called party's telephone 117, thereby signaling that the calling party is on the telephone ready to make the telephone call. The calling party's PC then places the telephone call to the called party's telephone 119, thereby completing the telephone call. It should be noted that at the present time it is possible to place a telephone call over the Internet. Therefore, the calling party's PC can place the call over the Internet to a called party's telephone or, in the alternative, the calling party's PC can simply place a call over the public switch telephone network to the called party's telephone.

Figure 5:
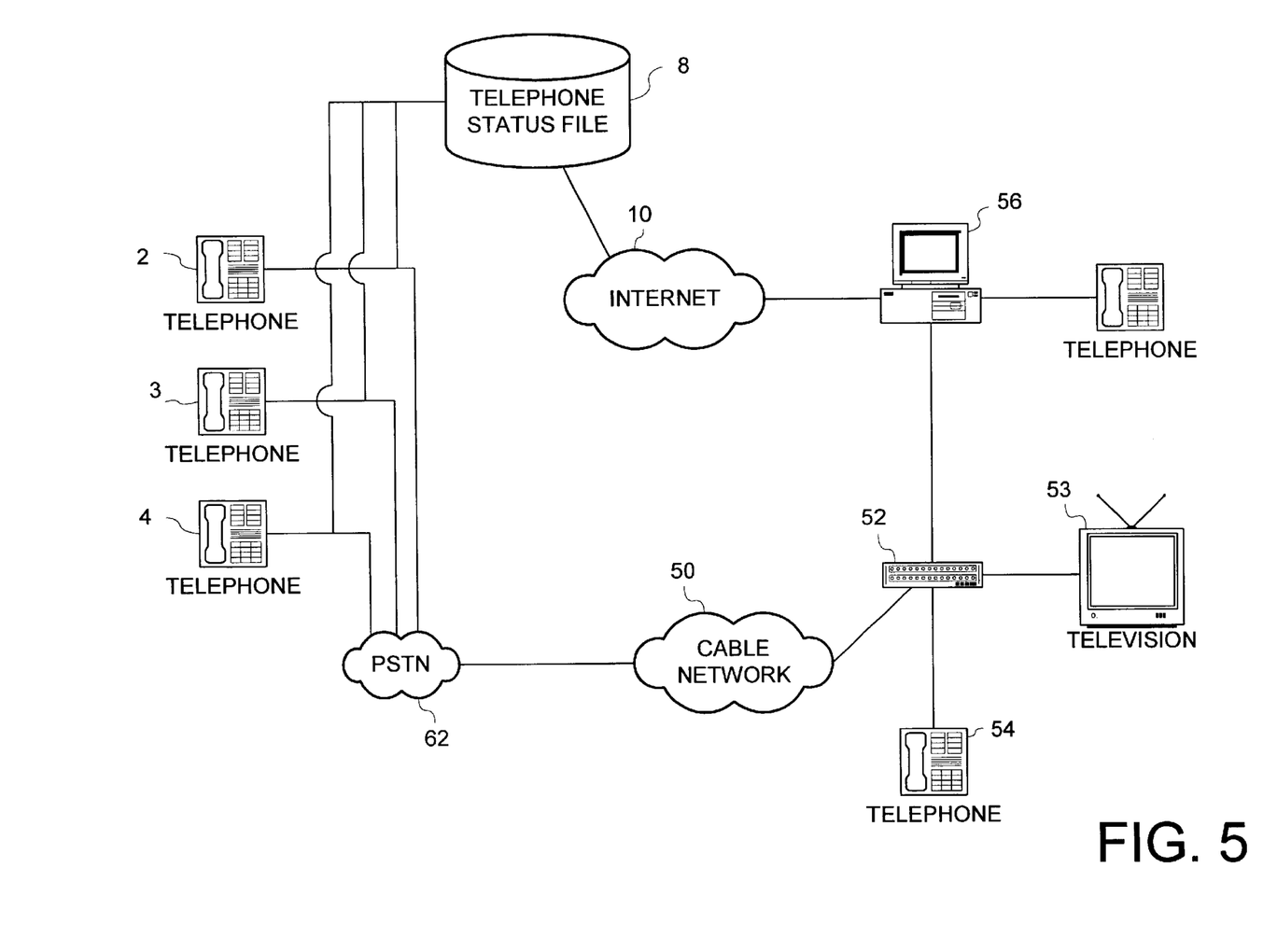
FIG. 5 illustrates an alternate embodiment using cable infrastructure.

Referring to FIG. 5, an alternative embodiment of the present invention using cable network services is shown. In this instance, the calling party is connected to cable service for voice and data services. The cable operator 50 is connected to the Internet using known cable-to-Internet connections. The set-top box at a calling party's location 52 is remotely connected to a cable operations center 50. Naturally, a television 53 is connected to the set-top box 52. In one embodiment, a calling party's telephone 54 is directly connected to be set-top box 52 where telephone service is offered over a cable network. In addition, however, the calling party's computer 56 can also be connected to the cable set-top box 52 and, using the access to the Internet 10 obtain the status of a remote telephone 2, 3, 4 via information in the telephone status file 8. The connection of the cable system can also be through any other voice/data interface provided by the cable carrier since set top boxes will not be the only interface to voice and data services over cable. If a calling party has a telephone 58 connected to the calling party's computer, upon obtaining a status indicating that a called party's telephone is available, calling party telephone 58 can make a telephone calls through the calling party's computer 56 through the set-top box (or other interface) 52 through the cable operations center 50 via the telephone company 60 over the normal public switched telephone network 62 to the called party's telephone 2,3 or 4.

Alternatively, where Internet telephone service is available and the calling party, via the computer 56 determines that a remote telephone is available, a calling party places a telephone call over the Internet via the calling party's telephone 58 through the calling party's computer 56 through the set-top box (or other interface) 52 to cable operator 50 through the Internet 10 via a computer at the called party's location 6 to the called party's telephone 2, 3, or 4.

Figure 6:
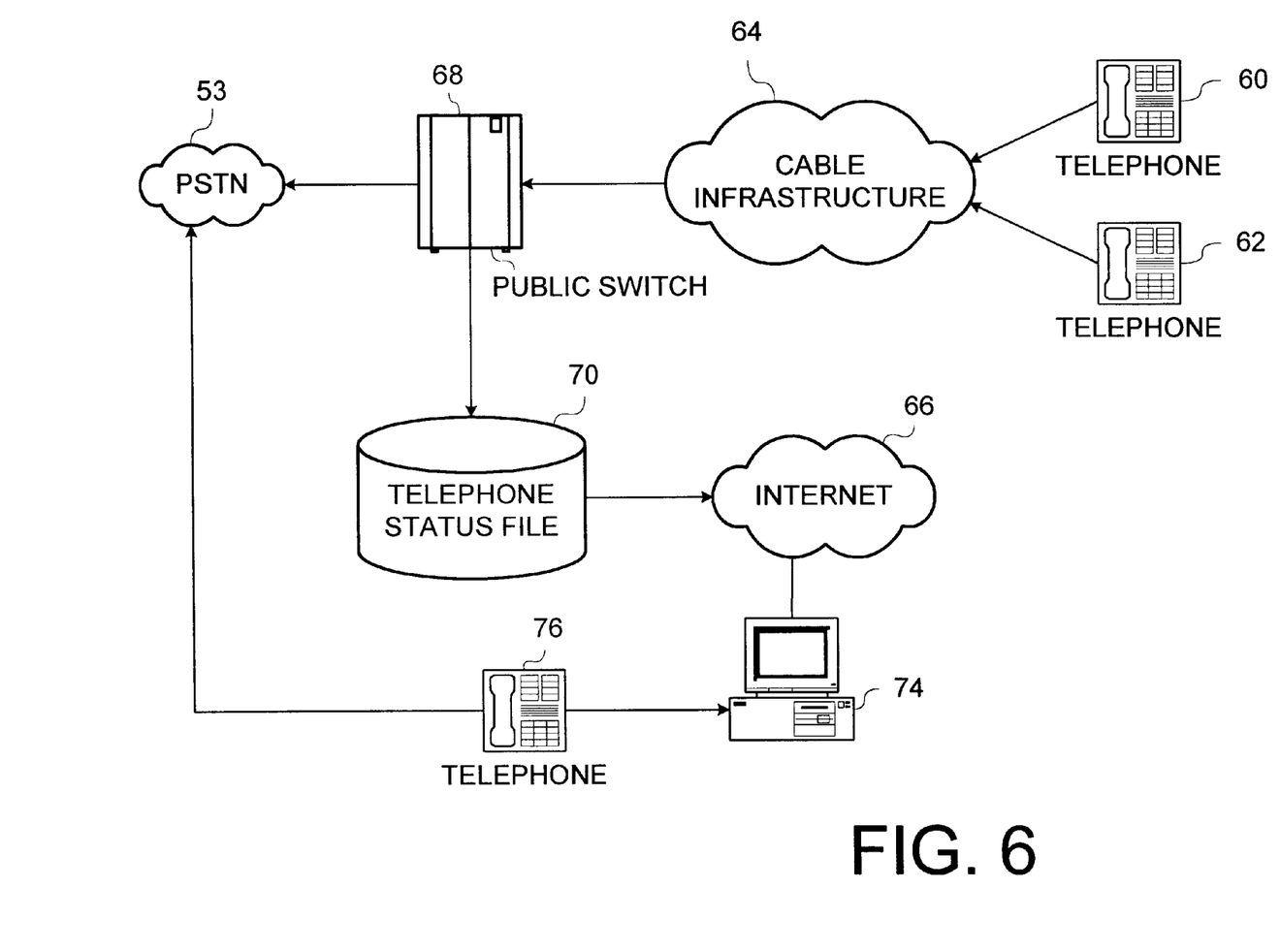
FIG. 6 illustrates a cable infrastructure embodiment with telephone status provided over the cable infrastructure.

Referring to FIG. 6 a cable infrastructure embodiment of the present invention is illustrated. Telephone 60, 62 are connect to a residential telephone service provided over a cable infrastructure. As noted above it is a growing trend in the current telecommunications market for telephone companies to merge with or acquire cable networks in order to provide local and long distance services over cable instead of over normal telephone wires.

When, for example, telephone 60 is making a call over cable infrastructure 64, the telephone call ultimately goes through some form of switch 68, and then to the public switched telephone network 72 for routing to its ultimate destination by known networks and means.

Switch 68, having knowledge of the off hook status of telephone 60, provides that status to telephone status file 70 which is accessible over the Internet 66

A calling party having a computer 74 can then access the Internet 66 to gain access to the telephone status file 70 thereby determining if user 60 is on the line or not.

Once the calling party determines that the called party telephone 60 is not off hook, a call can be made from the calling party telephone 76 over PSTN 72 to the called party 60. Alternatively, the calling party can place an Internet telephone call to the third party if the called party has this capability.

Thus it can be seen that the telephone status file can be accessed over those cable systems that are linked to the normal telephone company long distance operations.

A telephone line status monitoring system and method has been described herein. It will be appreciated by those skilled in the art that minor modifications to the present invention could be made without departing from the scope of the invention as disclosed. For example, it is also possible with the system of the present invention to monitor temperature of the home. In this instance, the system has a thermostat in place of the telephone system. The thermostat places its readings into a file over the Internet which can be read by a user when the user is at a remote location. In this manner the user can monitor home temperature during absences.

Similarly, just as messages can be transmitted to the user of the telephone, so can instructions to raise or lower temperature in the home be transmitted to the thermostat over the Internet.

Alarm monitoring can also be accomplished using the system and method of the present invention. In this instance, when an alarm goes off, the alarm company can be notified in the normal fashion. However, the alarm could also be noted in a file to be reviewed by a user when the user is away from the premises. In this case the user will know an alarm has gone off and can contact the alarm company to ascertain the meaning of the alarm.

An additional embodiment of the alarm concept of the present invention is for a formatted email to be sent to the owner of the premises so that the owner can have more specific notification of the meaning of any alarm that goes off.

A telephone status monitoring system and method has now been shown. It will be appreciated by those skilled in the art that other equipment in the home of office may be monitored as well using the system of the present invention without departing from the scope of the invention as disclosed.

We claim:

1. A system for obtaining equipment status over a network comprising:
   equipment adapted to provide output signals indicative of the status of the equipment;
   a first network connected to the equipment for receiving the signals from the equipment;
   a status file connected to the first network for receiving the output signals from the equipment over the first network;
   a second network connected to the status file;
   a processor connected to the second network, the processor comprising instructions for accessing the status file over the second network, and for displaying the status of the equipment to a user of the processor.

2. The system for obtaining equipment status over a network of claim 1 wherein the equipment comprises a plurality of telephones; and wherein the signals indicative of the Status of the equipment comprises off-hook signals from the plurality of telephones if any of the plurality of telephones are off-hook.

3. The system for obtaining equipment status over a network of claim 2 wherein the status file comprises the off-hook status of the plurality of telephones if any of the plurality of telephones is off hook.

4. The system for obtaining equipment status over a network of claim 3 wherein the first network is a public switched telephone network.

5. The system for obtaining equipment status over a network of claim 3 wherein the first network is a cable network.

6. The system for obtaining equipment status over a network of claim 3 wherein the second network is the Internet.

7. The system for obtaining equipment status over a network of claim 3 wherein the second network is a cable network.

8. A system for obtaining equipment status over a network comprising:
   equipment adapted to provide output signals indicative of the status of the equipment;
   a first network connected to the equipment for receiving the signals from the equipment;
   a status file connected to the first network for receiving the output signals from the equipment over the first network;
   a second network connected to the status file; and
   a processor connected to the second network, the processor comprising instructions for accessing the status file over the second network, and for displaying the status of the equipment to a user of the processor;
   wherein the equipment comprises at least one thermostat.

9. The system for obtaining equipment status over a network of claim 8 wherein the signals indicative of the status of the equipment comprises temperature.

10. A system for obtaining equipment status over a network comprising:
    equipment adapted to provide output signals indicative of the status of the equipment;
    a first network connected to the equipment for receiving the signals from the equipment;
    a status file connected to the first network for receiving the output signals from the equipment over the first network;
    a second network connected to the status file; and
    a processor connected to the second network, the processor comprising instructions for accessing the status file over the second network, and for displaying the status of the equipment to a user of the processor;
    wherein the status file comprises temperature signaled by at least one thermostat.

11. The system for obtaining equipment status over a network of claim 10 wherein the first network is a cable network.

12. The system for obtaining equipment status over a network of claim 10 wherein the first network is the Internet.

13. The system for obtaining equipment status over a network of claim 10 wherein the second network is a cable network.

14. The system for obtaining equipment status over a network of claim 10 wherein the second network is the Internet.

15. A system for determining telephone status over a network comprising:
    a plurality of telephones;
    a cable network to which the plurality of telephones are connected;
    a switch connected to the cable network for placing telephone calls over a public switched telephone network (PTSN), the switch comprising instructions for determining and transmitting telephone status;
    a telephone status file adapted to receive and store the telephone status from the switch;
    a second network connected to the telephone status file;
    at least one computer connected to the network, the computer comprising instructions for accessing the telephone status file over the second network.

16. The system for determining telephone status over a network of claim 15 wherein the second network is the Internet.

* * * * *

UNITED STATES PATENT AND TRADEMARK OFFICE
CERTIFICATE OF CORRECTION

PATENT NO. : 6,483,900 B1
DATED : November 19, 2002
INVENTOR(S) : Jon L. Roberts and Elliott D. Light It is certified that error appears in the above-identified patent and that said Letters Patent is hereby corrected as shown below:

Title page,
Item [63] Related U.S. Application Data, the filing date of the parent application, of which this is a continuation-in-part is changed from "10/20/1997" to -- 11/03/1997 --.

Signed and Sealed this

Fifth Day of October, 2004

JON W. DUDAS
*Director of the United States Patent and Trademark Office*